(12) United States Patent
Hulteen et al.

(10) Patent No.: US 7,279,210 B2
(45) Date of Patent: Oct. 9, 2007

(54) CURABLE COMPOSITIONS, METHODS OF MAKING AND USING THE SAME, AND ARTICLES THEREFROM

(75) Inventors: John C. Hulteen, Afton, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 99 days.

(21) Appl. No.: 11/239,455

(22) Filed: Sep. 7, 2005

(65) Prior Publication Data

US 2007/0054080 A1 Mar. 8, 2007

(51) Int. Cl.
B32B 37/26 (2006.01)
(52) U.S. Cl. .................. 428/41.4; 428/447; 528/15; 528/31; 525/102; 525/104
(58) Field of Classification Search ............. 528/15, 528/31; 525/102, 104; 428/447, 41.4
See application file for complete search history.

(56) References Cited

U.S. PATENT DOCUMENTS

| | | | |
|---|---|---|---|
| 2,823,218 A | 2/1958 | Speier et al. | |
| 2,970,150 A | 1/1961 | Bailey | |
| 3,159,601 A | 12/1964 | Ashby | |
| 3,159,662 A | 12/1964 | Ashby | |
| 3,220,972 A | 11/1965 | Lamoreaux | |
| 3,516,946 A | 6/1970 | Modic | |
| 3,814,730 A | 6/1974 | Karstedt | |
| 4,029,629 A | 6/1977 | Jeram | |
| 4,450,263 A | 5/1984 | West | |
| 4,504,645 A | 3/1985 | Melancon | |
| 4,510,094 A | 4/1985 | Drahnak | |
| 4,530,879 A | 7/1985 | Drahnak | |
| 4,533,575 A | 8/1985 | Melancon | |
| 4,980,440 A | 12/1990 | Kendziorski et al. | |
| 4,980,443 A | 12/1990 | Kendziorski et al. | |
| 5,145,886 A | 9/1992 | Oxman et al. | |
| 5,356,719 A | 10/1994 | Hamada et al. | |
| 5,446,118 A | 8/1995 | Shen et al. | |
| 5,461,134 A | 10/1995 | Leir et al. | |
| 5,475,124 A | 12/1995 | Mazurek et al. | |
| 5,482,991 A | 1/1996 | Kumar et al. | |
| 5,512,650 A | 4/1996 | Leir et al. | |
| 5,670,598 A | 9/1997 | Leir et al. | |
| 5,741,552 A | 4/1998 | Takayama et al. | |
| 5,792,554 A | 8/1998 | Leir et al. | |
| 6,326,072 B1 | 12/2001 | Ojeda et al. | |
| 6,407,195 B2 | 6/2002 | Sherman et al. | |
| 6,569,521 B1 | 5/2003 | Sheridan et al. | |
| 6,730,397 B2 | 5/2004 | Melancon et al. | |
| 6,750,277 B1 | 6/2004 | Yamana et al. | |
| 6,878,440 B1 | 4/2005 | Yamanaka et al. | |
| 7,199,197 B2 * | 4/2007 | Caldwell et al. | ............ 526/242 |
| 2005/0143541 A1 | 6/2005 | Caldwell et al. | |
| 2005/0143595 A1 | 6/2005 | Klun et al. | |
| 2005/0153542 A1 | 7/2005 | Keum | |

FOREIGN PATENT DOCUMENTS

| | | |
|---|---|---|
| EP | 0 781 811 A2 | 7/1997 |
| WO | WO96/30426 A1 | 10/1996 |
| WO | WO96/34028 A1 | 10/1996 |
| WO | WO96/34029 A1 | 10/1996 |
| WO | WO98/15602 A1 | 4/1998 |
| WO | WO99/14281 A1 | 3/1999 |

OTHER PUBLICATIONS

Qiu et al., "Fluoroacrylate-Mercaptofunctional Copolymers" U.S. Appl. No. 11/027,605, filed Dec. 28, 2004.
Qiu et al., "Fluoroacrylate-Multifunctional Acrylate Copolymer Compositions", U.S. Appl. No. 11/027,612, filed Dec. 28, 2004.
Moore et al., "Water- and Oil-Repellent Fluoroethanes and Fluoroureas", U.S. Appl. No. 11/027,633, filed Dec. 28, 2004.

* cited by examiner

*Primary Examiner*—Margaret G. Moore
(74) *Attorney, Agent, or Firm*—Bradford B. Wright (57) ABSTRACT

A curable composition comprises a fluoropolymer, a silicone having a plurality of vinyl groups, a silicone having a plurality of Si—H groups, and a hydrosilation catalyst. Reaction products of the curable composition are used as release materials for release liners and adhesive articles.

48 Claims, 2 Drawing Sheets

CURABLE COMPOSITIONS, METHODS OF MAKING AND USING THE SAME, AND ARTICLES THEREFROM

BACKGROUND

Many pressure sensitive adhesive tapes and other pressure sensitive adhesive coated articles have a release liner applied to the adhesive during or following manufacture. Release liners may be, for example, a simple polymeric film or a coated paper or film that has a release material applied thereto. Release liners may be used for various purposes, including, for example, preventing contamination or premature adhesion of the pressure sensitive adhesive layer, providing support to the pressure sensitive adhesive coated article (e.g., in the case of pressure sensitive adhesive transfer tapes) and identifying the articles to which they are applied.

Additionally, many pressure sensitive adhesive coated articles that are supplied in roll form or as stacks overcome the aforementioned problems of contamination or premature adhesion by incorporating a low adhesion backsize, that is, a release material applied to the surface of a carrier film opposite a pressure sensitive adhesive layer.

The choice of the release liner or low adhesion backsize typically depends on the particular pressure sensitive adhesive used. Known release materials include, for example, polyolefins, silicones, and fluoropolymers.

In any case, the release material is typically selected such that it adheres to the pressure sensitive adhesive layer during manufacturing, converting, shipping and storage, yet easily and smoothly releases from the pressure sensitive adhesive layer during use.

SUMMARY

In one aspect, the present invention provides a curable composition comprising:

(a) a fluoropolymer that is a reaction product of components comprising a polyfunctional (meth)acrylate and a fluoroacrylate monomer represented by the formula:

$$C_nF_{2n+1}-X-OCNH-A-HNCO-(C_pH_{2p})-OCC=CH_2$$

wherein:

n is an integer in a range of from 1 to 6, inclusive,

X is wherein:

R is H or an alkyl group having 1 to 4 carbon atoms;

m is an integer in a range of from 2 to 8, inclusive;

$R_f$ is $C_nF_{2n+1}$;

y is an integer in a range of from 0 to 6, inclusive;

q is an integer in a range of from 1 to 8, inclusive; and

A is a hydrocarbylene group;

p is an integer in a range of from 2 to 30, inclusive; and

R' is H, $CH_3$, or F;

(b) a silicone having a plurality of vinyl groups;

(c) a silicone having a plurality of Si—H groups; and (d) a hydrosilation catalyst.

In some embodiments, wherein the fluoropolymer is a reaction product of components comprising a polyfunctional (meth)acrylate and a fluoroacrylate monomer represented by the formula:

wherein R' is H, $CH_3$, or F.

In some embodiments, at least one of the silicones comprises a fluorosilicone.

In another aspect, the present invention provides a method of making a composition comprising at least partially curing a curable composition according to the present invention.

In yet another aspect, the present invention provides a composition comprising a reaction product of a curable composition according to the present invention.

Reaction products of curable compositions according to the present invention are typically useful as release materials, for example, as used in the manufacture of pressure sensitive adhesive articles. If sufficiently cured, reaction products of curable compositions according to the present invention typically have good solvent resistance, and in some instances can be used at levels that are more than an order of magnitude lower than other known release materials.

Accordingly, in another aspect, the present invention provides a release liner comprising a carrier and a release material, wherein the release material is present on at least one major surface of the carrier, and wherein the release material comprises a reaction product of a curable composition according to the present invention.

In some embodiments, reaction products of curable compositions according to the present invention exhibit reduced shock during separation of release materials incorporating them (i.e., the reaction products of the curable compositions)

from tackified polydiorganosiloxane polyurea block copolymer pressure sensitive adhesive layers.

In yet another aspect, the present invention provides an adhesive article comprising:

a substrate having first and second opposed major surfaces;

a first layer of pressure sensitive adhesive in contact with at least a portion of the first major surface; and a first release liner releasably bonded to at least a portion of the first adhesive layer, the first release liner comprising a first carrier and a first release material, wherein the first release material is present on at least one major surface of the first carrier, and wherein the first release material comprises a reaction product of a first curable composition according to the present invention.

In one embodiment, a second layer of pressure sensitive adhesive contacts at least a portion of the second major surface; and a second release liner is releasably bonded to at least a portion of the second adhesive layer, the second release liner comprising a second carrier and a second release material, wherein the second release material is present on at least one major surface of the second carrier, and wherein the second release material comprises a reaction product of a second curable composition according to the present invention.

In yet another aspect, the present invention provides an adhesive article comprising:

a substrate having first and second opposed major surfaces;

a layer of pressure sensitive in contact with at least a portion of the first major surface; and a low adhesion backsize bonded to the second major surface, wherein the low adhesion backsize comprises a reaction product of a curable composition according to the present invention.

In yet another aspect, the present invention provides an adhesive article comprising:

a substrate having first and second opposed major surfaces;

a layer of a first release material bonded to at least a portion of the first major surface;

a layer of a second release material bonded to at least a portion of the second major surface;

a layer of a first pressure sensitive adhesive releasably bonded to at least a portion of the layer of the first release material;

a layer of a second pressure sensitive adhesive releasably bonded to at least a portion of the layer of the second release material;

a first substrate bonded to at least a portion of the layer of the first pressure sensitive;

a second substrate bonded to at least a portion of the layer of the second pressure sensitive;

wherein at least one of the layer of the first release material and the layer of the second release material comprises a reaction product of a curable composition comprising:

(a) a fluoropolymer that is a reaction product of components comprising a second polyfunctional (meth)acrylate and a second monomer represented by the formula:

wherein:
n is an integer in a range of from 1 to 6, inclusive, wherein:
R is H or an alkyl group having 1 to 4 carbon atoms;
m is an integer in a range of from 2 to 8, inclusive;
$R_f$ is $C_nF_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, $CH_3$, or F;
(b) a silicone having a plurality of vinyl groups;
(c) a silicone having a plurality of Si—H groups; and
(d) a hydrosilation catalyst.

As used herein, the term

"fluorosilicone" means a silicone comprising at least some fluorine atoms;

"hydrocarbylene" means a divalent group formed by removing two hydrogen atoms from a hydrocarbon, the free valencies of which are not engaged in a double bond;

"(meth)acryl" includes acryl and methacryl;

"polyfunctional (meth)acrylate" means having more than one (meth)acrylate group; and in molecular formulae: "Me" means methyl, "Et" means ethyl, and "Ph" means phenyl or 1,4-phenylene depending on whether it is used in a monovalent or divalent context.

DETAILED DESCRIPTION

Curable compositions according to the present invention comprise a fluoropolymer as described below, a silicone having a plurality of vinyl groups, a silicone having a plurality of Si—H groups, and a hydrosilation catalyst.

The fluoropolymer comprises a reaction product of components comprising a polyfunctional (meth)acrylate and a fluoroacrylate monomer represented by the formula:

n is an integer in a range of from 1 to 6, inclusive. For example, n may be 1, 2, 3, 4, or 5.

X is wherein:
R is H or an alkyl group having 1 to 4 carbon atoms (e.g., methyl, ethyl, isopropyl, butyl);
m is an integer in a range of from 2 to 8, inclusive;
$R_f$ is $C_nF_{2n+1}$, wherein n is as previously defined;
y is an integer in a range of from 0 to 6, inclusive; and
q is an integer in a range of from 1 to 8, inclusive.
A represents a hydrocarbylene group, for example, methylene, ethylene, phenylene, or In some embodiments, the hydrocarbylene group may have less than 18, 16, 12, or even less that 7 carbon atoms. The hydrocarbylene group may be linear or branched and may contain one or more rings.
p is an integer in a range of from 2 to 30, inclusive.
R' is H, $CH_3$, or F.
In some embodiments, n is 4, p is 2, A is , and X is In such a case the fluoroacrylate monomer may be represented by the formula wherein R' is as previously defined. In the case that R' is H, the monomer is commonly referred to as MeFBSE-MDI-HEA, hereinafter referred to as "C4MH".

Methods for preparing fluoroacrylate monomers are known. Fluoroacrylate monomers may be prepared, for example, by first combining a corresponding fluorochemical alcohol and diisocyanate in a solvent, and then adding the hydroxy-terminated alkyl (meth)acrylate, for example, as described in U.S. Pat. Appln. Publ. No. 2005/0143541 A1 (Caldwell et al.), the disclosure of which is incorporated herein by reference. Useful solvents include esters (for example, ethyl acetate), ketones (for example, methyl ethyl ketone), ethers (for example, methyl tert-butyl ether), and aromatic solvents (for example, toluene). Typically, in such cases it is desirable to use a symmetric isocyanate to reduce the number of possible reaction products, but this is not a requirement.

Useful polyfunctional (meth)acrylates have at least two free-radically polymerizable (meth)acryl groups. Useful polyfunctional (meth)acrylates include (meth)acrylate monomers, (meth)acrylate oligomers, and (meth)acrylated polymers are readily commercially available, for example, from such vendors as Sartomer Company, Exton, Pa., and UCB Radcure, Smyrna, Ga. Exemplary (meth)acrylate monomers include ethylene glycol di(meth)acrylate, 1,3-butylene glycol di(meth)acrylate, 1,4-butanediol di(meth)acrylate, 1,6-hexanediol di(meth)acrylate, diethylene glycol di(meth)acrylate, triethylene glycol di(meth)acrylate, dipropylene glycol di(meth)acrylate, trimethylolpropane tri(meth)acrylate, glycerol tri(meth)acrylate, pentaerythritol tri(meth)acrylate, ethoxylated trimethylolpropane tri(meth)acrylate, neopentyl glycol di(meth)acrylate, pentaerythritol tetra(meth)acrylate, dipentaerythritol penta(meth)acrylate, sorbitol tri(meth)acrylate, alkoxylated cyclohexanedimethanol di(meth)acrylate, alkoxylated hexanediol di(meth)acrylate, alkoxylated neopentyl glycol di(meth)acrylate, cyclohexanedimethanol di(meth)acrylate, sorbitol hexa(meth)acrylate, bisphenol A di(meth)acrylate, ethoxylated bisphenol A di(meth)acrylates (e.g., ethoxylated (2) bisphenol A di(meth)acrylate, ethoxylated (3) bisphenol A di(meth)acrylate, ethoxylated (4) bisphenol A di(meth)acrylate, ethoxylated (6) bisphenol a di(meth)acrylate, ethoxylated (8) bisphenol A di(meth)acrylate, ethoxylated (10) bisphenol A di(meth)acrylate, and ethoxylated (30) bisphenol A di(meth)acrylate), ethylene glycol di(meth)acrylate, neopentyl glycol di(meth)acrylate, tetraethylene glycol di(meth)acrylate, polyethylene glycol di(meth)acrylates (e.g., polyethylene glycol (200) di(meth)acrylate, polyethylene glycol (400) di(meth)acrylate, polyethylene glycol (400) di(meth)acrylate, polyethylene glycol (600) di(meth)acrylate, and polyethylene glycol (700) di(meth)acrylate), polypropylene glycol (400) di(meth)acrylate, propoxylated (2) neopentyl glycol di(meth)acrylate, propoxylated neopentyl glycol di(meth)acrylate, tricyclodecanedimethanol di(meth)acrylate, triethylene glycol di(meth)acrylate, tripropylene glycol di(meth)acrylate, ethoxylated (15) trimethylolpropane tri(meth)acrylate, ethoxylated (3) trimethylolpropane tri(meth)acrylate, ethoxylated (12) trimethylolpropane tri(meth)acrylate, ethoxylated (6) trimethylolpropane tri(meth)acrylate, ethoxylated (9) trimethylolpropane tri(meth)acrylate, ethoxylated (20) trimethylolpropane tri(meth)acrylate, propoxylated (5.5) glyceryl tri(meth)acrylate, pentaerythritol tri(meth)acrylate, propoxylated (3) glyceryl tri(meth)acrylate, propoxylated (3) trimethylolpropane tri(meth)acrylate, propoxylated (6) trimethylolpropane tri(meth)acrylate, trimethylolpropane tri(meth)acrylate, tris(2-hydroxyethyl) isocyanurate tri(meth)acrylate, di-trimethylolpropane tetra(meth)acrylate, dipentaerythritol penta(meth)acrylate, ethoxylated (5) pentaerythritol tetra(meth)acrylate, dipentaerythritol penta(meth)acrylate, pentaerythritol tetra(meth)acrylate, and combinations thereof.

Exemplary useful (meth)acrylate oligomers include (meth)acrylated epoxy oligomers (e.g., Bisphenol-A based epoxy acrylate oligomers such as, for example, those marketed under the trade designations "EBECRYL 3500", "EBECRYL 3600", "EBECRYL 3720", and "EBECRYL 3700" by UCB Radcure), aliphatic urethane (meth)acrylate oligomers (e.g., as marketed by UCB Radcure under the trade designation "EBECRYL 8402"), aromatic urethane (meth)acrylate oligomers, and (meth)acrylated polyesters (e.g., as marketed by UCB Radcure under the trade designation "EBECRYL 870"). Additional useful polyfunctional (meth)acrylate oligomers include polyether oligomers such as a polyethylene glycol 200 diacrylate, for example, as marketed by Sartomer Company under the trade designation "SR 259"; and polyethylene glycol 400 diacrylate, for example, as marketed by Sartomer Company under the trade designation "SR 344"; and combinations thereof.

One or more monofunctional free-radically polymerizable monomers may be copolymerized with MeFBSE-MDI-HEA and at least one polyfunctional (meth)acrylate to form the fluoropolymer. Exemplary monofunctional free-radically polymerizable monomers include monofunctional (meth)acrylates such as, for example, 2-acrylic acid-2-((butylamino)carbonyl)oxyethyl ester, caprolactone (meth)acrylate, 2-ethylhexyl (meth)acrylate, 2-methylbutyl (meth)acrylate, methyl (meth)acrylate, ethyl (meth)acrylate, 4-methyl-2-pentyl (meth)acrylate, dodecyl (meth)acrylate, ethoxyethoxyethyl (meth)acrylate, hexyl (meth)acrylate, isoamyl (meth)acrylate, isobornyl (meth)acrylate, isobutyl (meth)acrylate, methoxy-polyethylenglycol-mono(meth)acrylate, tetrahydrofurfuryl (meth)acrylate, ethoxylated nonyl (meth)acrylate, alkoxylated lauryl (meth)acrylate, alkoxylated phenol (meth)acrylate, alkoxylated cyclic trimethylolpropane formal (meth)acrylate, dicyclopentadienyl (meth)acrylate, ethoxylated (10) hydroxyethyl (meth)acrylate, ethoxylated nonylphenol (meth)acrylate (e.g., ethoxylated (4) nonylphenol (meth)acrylate), isodecyl (meth)acrylate, isooctyl meth)acrylate, lauryl (meth)acrylate, methoxy polyethylene glycol (350) mono(meth)acrylate, methoxy polyethylene glycol (550) mono(meth)acrylate, polypropylene glycol mono(meth)acrylate, propoxylated (2) allyl (meth)acrylate, stearyl (meth)acrylate, tetrahydrofurfuryl (meth)acrylate, tridecyl (meth)acrylate, isononyl (meth)acrylate, isooctyl (meth)acrylate, n-butyl (meth)acrylate, n-decyl (meth)acrylate, n-nonyl (meth)acrylate, n-octyl (meth)acrylate, phenoxyethyl (meth)acrylate, tridecyl (meth)acrylate, behenyl (meth)acrylate, lauryl (methacrylate), (meth)acrylic acid, N-(meth)acryloylmorpholine, or dimethylaminopropyl (meth)acrylate; (meth)acrylamides such as, for example, N-methyl (meth)acrylamide or N,N-dimethyl (meth)acrylamide; N-vinyl lactams such as, for example, N-vinylpyrrolidone or N-vinylcaprolactam; (meth)acrylonitrile; and combinations thereof.

The components used to form the fluoropolymer may further comprise at least one chain transfer agent. If present, any chain transfer agent(s) is typically used in an amount in a range of from 0.1 to 5 percent by weight of the components, although other amounts may also be used. Suitable chain transfer agents typically include at least one of a hydroxyl, amino, or mercapto group, although other transfer agents such as, for example, halogenated chain transfer agents (e.g., carbon tetrabromide, bromotrichloromethane, or hexabromoethane) and aromatics (e.g., cumene), mixtures thereof, may also be used. The chain transfer agent may include two or more of such hydroxyl, amino, or mercapto groups. Exemplary useful chain transfer agents include those selected from 2-mercaptoethanol, 3-mercapto-2-butanol, 3-mercapto-2-propanol, 3-mercapto-1-propanol, 3-mercapto-1,2-propanediol, 2-mercapto-ethylamine, bis(2-mercaptoethyl)sulfide, octyl mercaptan, dodecyl mercaptan or a mercapto functionalized polysiloxane such as 3-(trimethoxysilyl)propyl mercaptan.

In some embodiments, the fluoropolymer may be essentially free of (i.e., contain less than 0.1 mole percent of) acidic groups (e.g., $-SO_3H$, $-PO_3H$, $-CO_2H$).

Curable compositions according to the present invention include at least one silicone having a plurality of vinyl groups. Examples of useful silicone having a plurality of vinyl groups include vinyl terminated polydimethylsiloxanes having the formula $H_2C=CHSiMe_2O(SiMe_2O)_nSiMe_2CH=CH_2$ (CAS 68083-19-2); vinyl terminated dimethylsiloxane-diphenylsiloxane copolymers having the formula $H_2C=CHSiMe_2O(SiMe_2O)_n(SiPh_2O)_nSiMe_2CH=CH_2$ (CAS: 68951-96-2); vinyl terminated polyphenylmethylsiloxanes having the formula $H_2C=CHSiMePhO(SiMePhO)_nSiMePhCH=CH_2$ (CAS: 225927-21-9); vinyl-phenylmethyl terminated vinylphenylsiloxane-methylphenylsiloxane copolymers (CAS: 8027-82-1); vinyl terminated trifluoropropylmethylsiloxane-dimethylsiloxane copolymers having the formula $H_2C=CHSiMePhO(SiMe_2O)_n(SiMeCH_2CH_2CF_3O)_mSiMePhCH=CH_2$ (CAS: 68951-98-4); vinyl terminated dimethylsiloxane-diethylsiloxane copolymers having the formula $H_2C=CHSiMe_2O(SiMe_2O)_n(SiEt_2O)_nSiMe_2CH=CH_2$; trimethylsiloxy terminated vinylmethylsiloxane-dimethylsiloxane copolymers $Me_3SiO(SiMe_2O)_n(SiMe(CH=CH_2)O)_mSiMe_3$ (CAS: 67762-94-1); vinyl terminated vinylmethylsiloxane-dimethylsiloxane copolymers having the formula $H_2C=CH(SiMe_2O)_n(SiMeCH=CH_2O)_mSiMe_2CH=CH_2$ (CAS: 68063-18-1); vinylmethylsiloxane homopolymers (cyclic and linear) having the formula $Me_3SiO(SiMe(CH=CH_2)O)_nSiMe_3$; and vinyl T-structure polymers having the formula $MeSi[O(SiMe_2O)_mSiMe_2CH=CH_2]_3$; all commercially available from vendors such as, for example, Gelest, Inc., Morrisville, Pa. or Dow Corning Corp., Midland, Mich. Additional useful silicones having a plurality of vinyl groups include a vinyl-terminated fluorosilicone that is commercially available under the trade designations "SYL-OFF Q2-7785" from Dow Corning Corp.

Curable compositions according to the present invention also include at least one silicone having a plurality of Si—H groups (commonly referred to in the art as "crosslinker"). Examples of useful Si—H group containing silicones include hydride terminated polydimethylsiloxanes having the formula $HMe_2SiO(SiMe_2O)_nSiMe_2H$ (CAS 70900-21-9); hydride terminated methylhydrosiloxane-dimethylsiloxane copolymers having the formula $HMe_2SiO(SiMe_2O)_n(SiMeHO)_nSiMe_2H$ (CAS 69013-23-6); trimethylsiloxane terminated polyethylhydrosiloxanes having the formula $Me_3SiO(SiMeHO)_nSiMe_3$ (CAS 63148-57-2); trimethylsiloxane terminated methylhydrosiloxane-dimethylsiloxane copolymers having the formula $Me_3SiO(SiMe_2O)_n(SiMeHO)_nSiMe_3$ (CAS 68037-59-2); triethylsiloxane terminated polyethylhydrosiloxanes having the formula $Et_3SiO(SiEtHO)_nSiEt_3$ (CAS 24979-95-1); hydride terminated poly(phenyl-dimethylhydrosiloxysiloxanes) having the formula $HSiMe_2O(SiPh(OSiMe_2H)O)_nSiMe_2H$; all commercially available from vendors such as, for example, Gelest, Inc. or Dow Corning Corp.

In some embodiments, at least one of the silicone having a plurality of vinyl groups or the silicone having a plurality of Si—H groups may be at least partially fluorinated (i.e., be a fluorosilicone). Details concerning preparation and crosslinking of fluorinated silicones having a plurality of vinyl groups may be found in, for example, U.S. Pat. No. U.S. Pat. No. 4,980,440 (Kendziorski et al.); U.S. Pat. No. 4,980,443 (Kendziorski et al.); and U.S. Pat. No. 5,356,719 (Hamada et al.). Commercially available fluorosilicones of these types and that are capable of participating in hydrosilation reactions include vinyl terminated (35-45% trifluoropropylmethylsiloxane)—dimethylsiloxane copolymer available from Gelest, Inc.; and a 100% active solids fluorofunctional silicone crosslinker having the trade designation "SYL-OFF Q2-7560 CROSSLINKER" available from Dow Corning Corp.

The silicone having a plurality of vinyl groups and the silicone having a plurality of Si—H groups react by hydrosilation. Accordingly, at least one hydrosilation catalyst (including photo-catalysts) is included in curable compositions according to the present invention to facilitate curing. Useful hydrosilation catalysts include thermal catalysts (e.g., platinum catalysts), which are effective for catalyzing the hydrosilation reaction between silicon-bonded hydrogen groups and silicon-bonded ethylenic groups. Further details concerning thermal hydrosilation catalysts may be found, for example, in U.S. Pat. No. 2,823,218 (Speier et al.); U.S. Pat. No. 2,970,150 (Bailey); U.S. Pat. No. 3,159,601 and U.S. Pat. No. 3,159,662 (Ashby); U.S. Pat. No. 3,220,972 (Lamoreaux); U.S. Pat. No. 3,516,946 (Modic); U.S. Pat. No. 3,814,730 (Karstedt); U.S. Pat. No. 4,029,629 (Jeram); U.S. Pat. No. 4,533,575 and U.S. Pat. No. 4,504,645 (Melancon); and U.S. Pat. No. 5,741,552 (Takayama, et al.); the disclosures of which are incorporated herein by reference.

Photoactivated hydrosilation catalysts (i.e., photocatalysts) may also be used. Examples of hydrosilation photocatalysts and methods of their use (e.g., photocuring conditions) may be found, for example, in U.S. Pat. Nos. 4,510,094 and 4,530,879 (Drahnak); 5,145,886 (Oxman et al.); the disclosures of which are incorporated herein by reference.

Combinations of the hydrosilation catalysts and photocatalysts and/or curing methods may also be used.

The catalyst is typically present in an amount that is effective to catalyze the hydrosilation reaction. More typically, the catalyst is present in amounts sufficient to provide as little as one part of catalyst, or less, per million parts of the silicone having vinyl groups. On the other hand, amounts of the catalyst sufficient to provide as high as 1 to 10, or more, parts of catalyst per 1,000 parts of the silicone having vinyl groups may also be used.

In some embodiments, the weight ratio of fluoropolymer to silicone components is in a range of from 1:2 to 2:1, 5:1 or even 10:1, inclusive, although weight ratios outside this range may also be used.

Typically, curable compositions according to the present invention may be prepared by routine mixing procedures, however, it is generally desirable to add catalysts last, in order to maximize useable pot-life of the curable composition. Curable compositions according to the present invention may be at least partially cured to form compositions that typically have good release properties, although this is not a requirement. The release properties of such compositions make them useful, for example, in the manufacture of release liners and adhesive articles.

Figure 1:
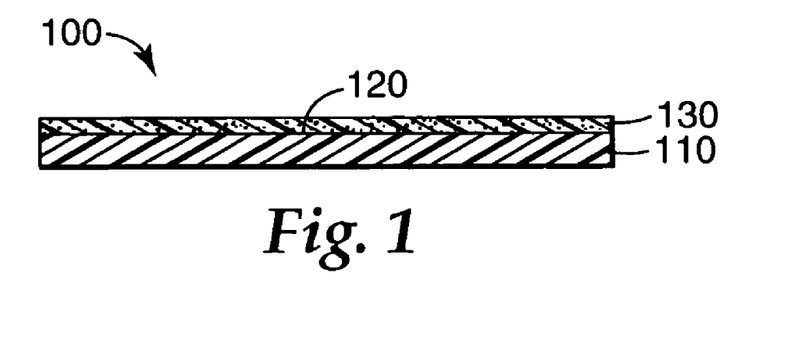
FIG. 1 is a side view of an exemplary release liner according to one embodiment of the present invention.

An exemplary release liner is shown in FIG. 1. Referring now to FIG. 1, release liner 100 has carrier 110 with major surface 120. Release material 130 is bonded to at least a portion of major surface 120. Release material 130 comprises a reaction product of a curable composition according to the present invention.

Suitable carriers include, for example, plastic films (e.g., polyester film, polypropylene film, or polyethylene film) and papers (e.g., kraft paper). The carrier typically has a thickness in a range of from about 0.05 mm (0.002 inches) to about 0.12 mm (0.005 inches), although thicknesses outside this range may also be used. Typically, the carrier is smooth, although textured carriers may be useful for some applications.

Release material 130 may be applied to carrier 110 by any suitable method including, for example, bar coating, spraying, roll coating, knife coating, and dip coating.

Curable compositions according to the present invention are also useful, for example, in the fabrication of adhesive articles.

Figure 2:
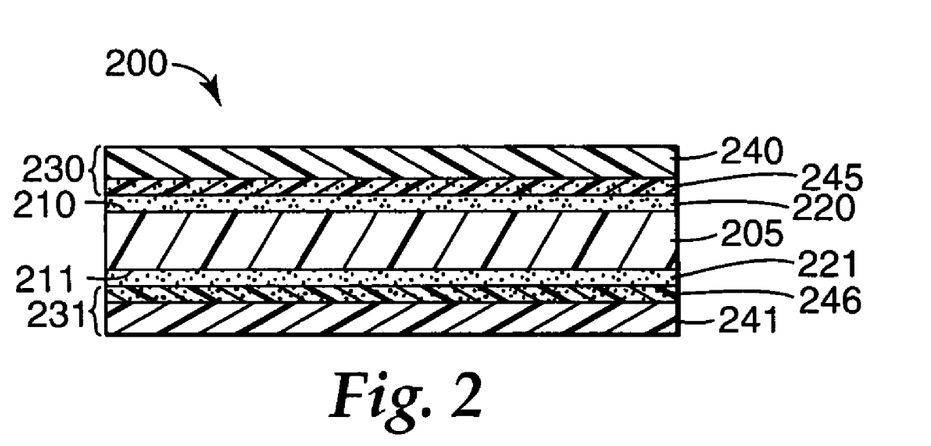
FIG. 2 is a side view of an exemplary adhesive article according to one embodiment of the present invention.

One exemplary adhesive article is shown in FIG. 2. Referring now to FIG. 2, adhesive article 200 comprises substrate 205 having first and second opposed major surfaces 210, 211. First pressure sensitive adhesive layer 220 is adhesively bonded to at least a portion of first major surface 210. First release liner 230 is releasably bonded to at least a portion of the first layer of pressure sensitive adhesive 220. First release liner 230 comprises first carrier 240 and a layer of first release material 245, which contacts adhesive layer 220. First release material 245 comprises a reaction product of a first curable composition according to the present invention. Optional second layer of pressure sensitive adhesive 221 contacts at least a portion of second major surface 211, and optional second release liner 231 is releasably bonded to at least a portion of second pressure sensitive adhesive layer 221. Optional second release liner 231 comprises second carrier 241 and has a layer of second release material 246 on at least one major surface of second carrier 241. Second release material 246 comprises a reaction product of a second curable composition according to the present invention. In some embodiments, the first and second curable compositions are identical, while in others they are different.

Suitable substrates include, for example, plastic films (e.g., polyester film, polypropylene film, or polyethylene film), paper, and metal foils, although any solid material may be used.

The first and second pressure sensitive adhesives may comprise any pressure sensitive adhesive (i.e., psa) such as, for example, hot melt psa's, acrylic psa's, urethane psa's, and silicone psa's. In some embodiments, the pressure sensitive adhesive may comprise a tackified polydiorganosiloxane polyurea block copolymer as described, for example, in U.S. Pat. No. 6,569,521 (Sheridan et al.); U.S. Pat. No. 5,461,134 (Leir et al.); U.S. Pat. No. 5,512,650 (Leir et al.); U.S. Pat. No. 5,792,554 (Leir et al.); U.S. Pat. No. 6,407,195 (Sherman et al.); U.S. Pat. No. 6,730,397 (Melancon et al.); the disclosures of which are incorporated herein by reference.

Figure 3:
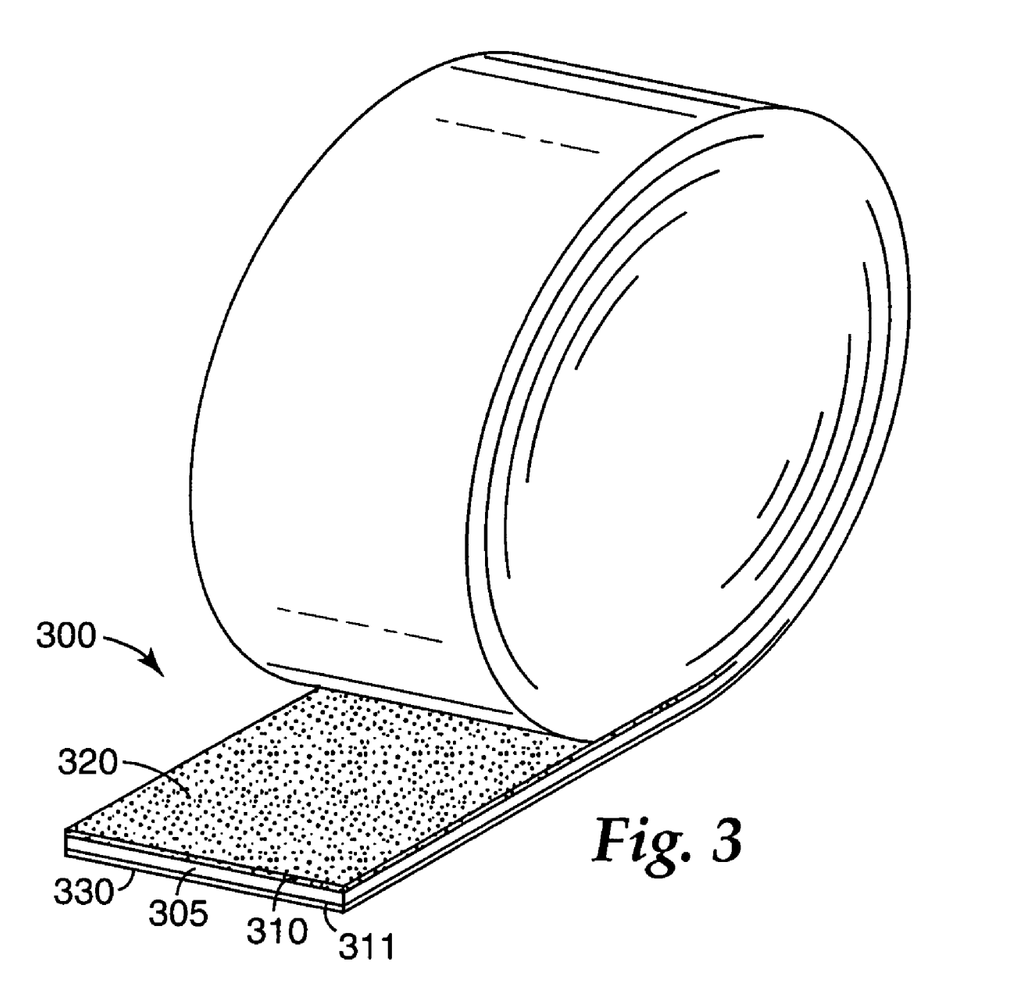
FIG. 3 is a perspective view of an exemplary adhesive article in roll form according to one embodiment of the present invention.

In another embodiment, an adhesive article may comprise a roll as shown in FIG. 3. Referring now to FIG. 3, adhesive article 300 comprises substrate 305 having first and second opposed major surfaces 310, 311. Pressure sensitive adhesive layer 320 is bonded to at least a portion of first major surface 310. Low adhesion backsize layer 330 is bonded to at least a portion of second major surface 311, and comprises a reaction product of a curable composition according to the present invention. In roll form, as shown in FIG. 3, pressure sensitive adhesive layer 320 is releasably bonded to backsize 330. In addition to roll form, adhesive articles according to the present invention may also be manufactured into other forms such as, for example, a stack of adhesive sheets.

Figure 4:
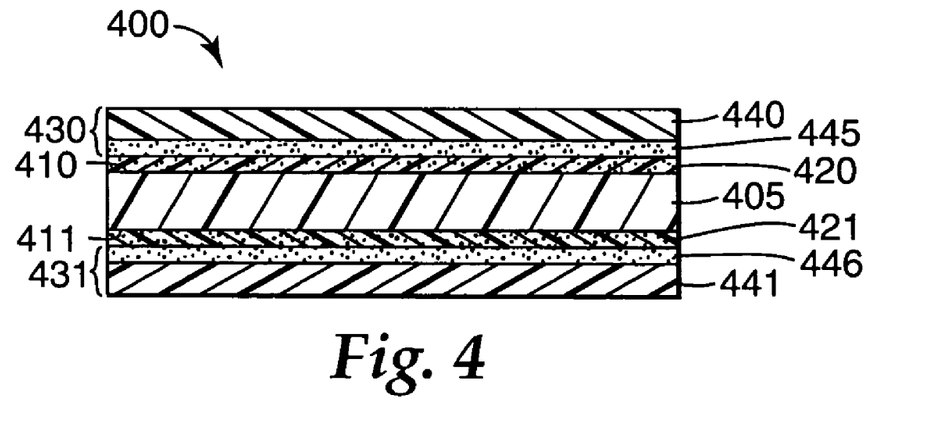
FIG. 4 is a side view of an exemplary adhesive article according to one embodiment of the present invention.

In another embodiment, an adhesive article may comprise a double sided release liner as shown in FIG. 4. Referring now to FIG. 4, adhesive article 400 comprises first substrate 405 having first and second opposed major surfaces 410, 411. A layer of first release material 420 is bonded to at least a portion of first major surface 410. A layer of second release material 421 is bonded to at least a portion of second major surface 411. First adhesive member 430 comprises second substrate 440 bonded to first pressure sensitive adhesive layer 445. Layer of first pressure sensitive adhesive 445 is releasably bonded to layer of first release material 420. Second adhesive member 431 comprises third substrate 441 bonded to second pressure sensitive adhesive layer 446. Layer of second pressure sensitive adhesive 446 is releasably bonded to layer of second release material 421.

In FIGS. 3 and 4, the substrates, pressure sensitive adhesives, and release materials may generally be as described as in relation to FIGS. 1 and 2.

The layers of first and second pressure sensitive adhesives and/or their associated layers of first and second release materials, respectively, may be the same or different, but are typically selected such that the release of each pressure sensitive adhesive from its associated release material occurs at a different level of applied peel force.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

Test Methods

Release Test

Samples were prepared for release testing by attaching 3-layer laminates of backing/adhesive/liner to a 17.8 centimeter by 33 centimeter steel panel using double-coated adhesive tape (commercially available from 3M Company under the trade designation "410B") via the non-release side of the liner using a 2.3 kg rubber roller. The backing/adhesive was then peeled from the liner at 180° at a rate of 2.3 meters/minute (90 inches/minute). All tests were done in a facility at constant temperature (70° C.) and constant humidity (50% RH). In the case of shocky peel, the minimum, maximum and average peel values are all reported to indicate the level of shockiness and a description of the peel was also included. To determine the readhesion value, the peeled adhesive strip was applied to the surface of a clean glass plate by means of a 2.3 kg rubber roller. The readhesion value was a measure of the force required to pull the tape from the glass surface at an angle of 180° at a rate of 2.3 meters/minute (90 inches/minute). The peel tester used for all examples was an IMass model SP2000 peel tester obtained from IMASS, Inc., Accord, Mass., Measurements were obtained in grams/inch and converted to Newtons per decimeter.

Rub Test

A finger was rubbed across the film approximately 15 times and loss of release coating was evaluated. Loss was determined by visual observation, changes in peel force across the surface using transparent tape having the trade designation "SCOTCH MAGIC TAPE", available from 3M Company, or by wetting characteristics of a black marker (available under the trade designation "SHARPIE PERMANENT MARKER" from Sanford Corp., Bellwood, Ill.) over the rubbed area.

Dynamic Contact Angle Measurement

A coating solution (typically at about 5% solids by weight) was prepared. The nylon-6,6 film (available from E. I. du Pont de Nemours & Co., Wilmington, Del.) was pretreated as follows:

The film was cut into 85 mm×13 mm rectangular strips. Taking care not to touch the strip's surface, each strip was cleaned by dipping into methyl alcohol, wiped with a paper tissue (commercially available under the trade designation "KIMWIPE" from Kimberly Clark Corp., Boswell, Ga.), and allowed to dry for 15 minutes. Then, using a small binder clip to hold one end of the strip, the strip was immersed into the prepared coating solution, and the strip was then withdrawn slowly and smoothly from the solution. The coated strip of film was tilted to allow any solution run-off to accumulate at the corner of the strip, and a paper tissue (i.e., "KIMWIPE") was touched to the corner to pull away the solution buildup. The coated strip of film was allowed to air dry in a protected location for a minimum of 10 minutes and then was cured for 2 minutes at 150° C.

Advancing and receding contact angles on the coated film were measured using a CAHN Dynamic Contact Angle Analyzer, Model DCA 322 (a Wilhelmy balance apparatus equipped with a computer for control and data processing, commercially available from ATI, Madison, Wis.). Water and hexadecane were used as probe liquids. Values for both water and hexadecane were measured using the standard protocol for the instrument.

Marker Resistance Test

Permanent black markers (available under the trade designation "SHARPIE PERMANENT MARKER" designated Marker 1 and "KING SIZE PERMANENT MARKER" designated Marker 2 from Sanford Corp., Bellwood, Ill.) were used for marker resistance test. The tip of a Marker 2 was cut with a razor blade at an angle to allow for a wide marking width. Using a ruler, a straight line was drawn on the test sample using the marking at a speed of approximately 6 inches per second. The marked sample was then placed next to a 1-5 rating standard with 1 being the lightest and 5 being the darkest. The process was repeated three times and the average of the three tests was reported.

TABLE OF ABBREVIATIONS USED IN THE EXAMPLES

| ABBREVIATION | DESCRIPTION |
|---|---|
| C4MH | $C_4F_9SO_2N(Me)C_2H_4OC(=O)NH-Ph-CH_2-Ph-NHC(=O)O-(CH_2)_2OC(=O)CH=CH_2$, prepared as described in U.S. Pat. Appl. Publ. No. 2005/0143541 A1 (Caldwell et al.), Example 3 |
| C4HD | $C_4F_9SO_2NMeC_2H_4OC(=O)NH(CH_2)_6NHC(=O)O-(CH_2)_{10}OC(=O)CH=CH_2$, prepared as described in U.S. Pat. Appl. Publ. No. 2005/0143541 A1 (Caldwell et al.), Example 2, except using $HO(CH_2)_{10}OC(=O)CH=CH_2$ instead of $HO(CH_2)_{12}OC(=O)CH=CH_2$ |
| C4HDD | $C_4F_9SO_2N(Me)C_2H_4OC(=O)NH(CH_2)_6NHC(=O)O-(CH_2)_{12}OC(=O)CH=CH_2$, prepared as described in U.S. Pat. Appl. Publ. No. 2005/0143541 A1 (Caldwell et al.), Example 2 |
| PEGDA | $CH_2=CHC(=O)O(CH_2CH_2O)_nC(=O)CH=CH_2$, polyethylene glycol diacrylate, molecular weight (MW) ~700 g/mole |
| HDDA | $CH_2=CHC(=O)O(CH_2)_6OC(=O)CH=CH_2$ commercially available under the trade designation "SR-238" from Sartomer Co. |
| MS | mercaptosilane with the formula $HS(CH_2)_3Si(OMe)_3$ available under the trade designation "A-189" |
| AA | acrylic acid |
| EtOAc | ethyl acetate |
| MEK | methyl ethyl ketone |
| DMF | dimethylformamide |
| Silicone-1 | $C_4F_9$-containing vinyl terminated polysiloxane with platinum catalyst commercially, supplied as 80% solids in heptane, available under the trade designation "SYL-OFF Q2-7785" from Dow Corning Corp. |
| Silicone-2 | $C_4F_9$-containing vinyl terminated polysiloxane with Platinum catalyst, available under the trade designation "SYL-OFF Q2-7786" from Dow Corning Corp. |
| Silicone-3 | vinyl terminated polydimethylsiloxanes, molecular weight ~17,200 g/mole, available under the trade designation "DMS-V25" from Gelest, Inc. |
| Crosslink-1 | $C_4F_9$-containing hydride terminated polysiloxane, available under the trade designation "SYL-OFF Q2-7560" from Dow Corning Corp. |
| Crosslink-2 | polysiloxane with methylhydrosiloxane (15-18%) and dimethylsiloxane (82-85%), commercially available from United Chemical Technologies, Petrarch Systems, Bristol, Pennsylvania |
| Crosslink-3 | hydride terminated hydromethylsiloxane-methylphenylsiloxane copolymer; $H-(SiMePh-O)_n-(SiHMe-O)_m-SiMePh-H$ (n/m = 50~55/45~50), available under the trade designation "PS-129-5" from Huels America, Bristol, Pennsylvania |
| Platinum Catalyst | platinum-divinyl tetramethyldisiloxane complex in vinylsilicone as a 0.15% solution in heptane, available under the trade designation "SIP 6830-3" from Gelest, Inc. |
| Adhesive 1 | pressure sensitive adhesive prepared as described in U.S. Pat. No. 6,569,521 (Sheridan et al.), Example 28. |
| Tape 1 | pressure sensitive adhesive tape, available from 3M Company under the trade designation "SCOTCH 845 BOOK TAPE" |
| Tape 2 | pressure sensitive adhesive tape, available from 3M Company under the trade designation "SCOTCH 610 TAPE" |
| PET film-1 | 51-micrometer (2.0 mil) thick corona treated polyethylene terephthalate film available from 3M Company |
| PET film-2 | 127-micrometer (5-mil) thick polyethylene terephthalate (PET) film available from E.I. du Pont de Nemours & Co. under the trade designation "MELINEX 618" |
| PET film-3 | 51-micrometer (2.0 mil) thick primed polyethylene terephthalate film, available from Mitsubishi, Greer, South Carolina under the trade designation "35AB". |
| Initiator | A thermal free radical initiator available from E.I. du Pont de Nemours & Co. under the trade designation "VAZO 67" |

Preparation of Fluorinated Polymer Solutions

Copolymer-1, C4MH/PEGDA/MS (90/10/2, CP-1):

In a glass bottle was placed 45.0 grams of C4MH (62.2 mmol), 5.0 grams of PEGDA, 0.50 gram of MS, 151.5 grams of EtOAc and 1.25 grams of Initiator (2.47% by weight). The solution was purged with nitrogen for one minute; then, the bottle was sealed and placed in a 70° C. oil bath, and stirred for 24 hours. The resulting clear polymer solution (20% solids) was diluted to 3-5% by weight with a 5/95 DMF/EtOAc solvent mixture. Chromatographic analysis of the solution showed that the conversion was 95.4 percent; $M_n$~7270, $M_w$~56500, and $M_w/M_n$=7.8.

Copolymer-2, C4MH/HDDA/MS (90/10/2, CP-2):

In a glass bottle was placed 24 grams of a 37.5% by weight solution of C4MH in EtOAc (9.0 grams C4MH, 12.45 mmol), 1.03 grams of HDDA, (4.56 mmol), 0.2 grams of MS, 26.8 grams of additional EtOAc, and 0.15 gram of Initiator. The solution was purged with nitrogen for two minutes; then, the bottle was sealed and placed in a 70° C. oil bath, and stirred for 24 hours. The resulting clear polymer solution was diluted with a 5/95 DMF/EtOAc solvent mixture to 3-5% by weight.

Copolymer-3, C4HD/PEGDA/MS (90/10/2, CP-3):

In a glass bottle was placed 9.0 grams of C4HD (11.95 mmol), 1.0 gram of PEGDA (1.43 mmol), 0.2 gram of MS, 40 grams of EtOAc, and 0.15 gram of Initiator. The solution was purged with nitrogen for two minutes; then, the bottle was sealed and placed in a 70° C. oil bath, and stirred for 24 hours. The resulting clear polymer solution was diluted with a 5/95 DMF/EtOAc solvent mixture to 3-5% by weight.

Copolymer-4, C4HDD/PEGDA/MS (90/10/2, CP-4):

In a glass bottle was placed 9.0 grams of C4HDD (11.52 mmol), 1.0 gram of PEGDA (1.43 mmol), 0.2 gram of MS, 40 grams of EtOAc, and 0.15 gram of Initiator. The solution was purged with nitrogen for two minutes; then, the bottle was sealed and placed in a 70° C. oil bath, and stirred for 24 hours. The resulting clear polymer solution was diluted with a 5/95 DMF/EtOAc solvent mixture to 3-5% solids.

Copolymer-5, C4MH/PEGDA/AA (90/10/4, CP-5):

In a glass bottle was placed 9.0 grams of C4MH (12.44 mmol), 1.0 gram of PEGDA (1.43 mmol), 0.4 gram of AA (0.56 mmol), 40 grams of EtOAc, and 0.149 gram of Initiator. The solution was purged with nitrogen for two minutes; then, the bottle was sealed and placed in a 70° C. oil bath, and stirred for 24 hours. The resulting clear polymer solution was diluted with a 5/95 DMF/EtOAc solvent mixture to 3-5% solids.

Silicone Solutions for Crosslink Blending

SC-1: a 5% solution of Silicone-1 and Crosslink-1 in 25/0.8 weight ratio in heptane.
SC-2: a 5% solution of Silicone-2 and Crosslink-1 in 25/0.8 weight ratio in heptane.
SC-3: a solution of 0.5 parts of Silicone-2 and 0.5 parts of Crosslink-2 using Platinum Catalyst.
SC-4: a mixture of Silicone-1/Crosslink-3 (100/2% by weight) as a 5% by weight solution in hexane was prepared.
SC-5: a mixture of Silicone-3/Crosslink-1/Platinum Catalyst (100/3/0.2% by weight) as a 5% by weight solution in hexane was prepared.

Blending Effect on Release Properties

Comparative Example C1

A release film was prepared by coating a solution of CP-1 (0.2% solids by weight diluted with MEK) on PET film-1 using a No. 6 Mayer rod, and then drying the coated film for 2 minutes at 150° C. Adhesive 1 was wet cast onto this release film by spreading the adhesive onto the release film using a notch bar coater 15 centimeters wide (6 inches) with a 356 micrometer (14 mil) wet gap. This adhesive coated release film was attached to a fiberboard frame and dried for 10 minutes at 70° C. The adhesive/release film system was then laminated to PET film-3. The laminate was then subjected to the Release Test. Results are reported in Table 1.

Example 1

A release film was prepared by coating a blended mixture of solution of 5 parts of CP-1, 1 parts of SC-3 using Platinum Catalyst at 0.5% solids in MEK on a PET film-1 using a No. 6 Mayer rod, and then drying the coated film for 10 minutes at 150° C. Adhesive 1 was wet cast onto this release film by spreading the adhesive onto the release film using a notch bar coater 15 centimeters wide (6 inches) with a 356 micrometer (14 mil) wet gap. This adhesive coated release film was attached to a fiberboard frame and dried for 10 minutes at 70° C. The adhesive/release film system was then laminated to PET film-3. The laminate was then subjected to the Release Test. Results are reported in Table 1.

Example 2

A release film was prepared by coating a blended mixture of solution of 5 parts of CP-1 and 1 part of SC-1 (0.2% solids by weight in MEK) on PET film-1 using a No. 6 Mayer rod, and then drying the coated film for 10 minutes at 150° C. Adhesive 1 was wet cast onto this release film by spreading the adhesive onto the release film using a notch bar coater 15 centimeters wide (6 inches) with a 356 micrometer (14 mil) wet gap. This adhesive coated release film was attached to a fiberboard frame and dried for 10 minutes at 70° C. The adhesive/release film system was then laminated to PET film-3. The laminate was then subjected to the Release Test. Results are reported in Table 1 (below).

TABLE 1

| Example | Minimum Release Force, N/dm | Maximum Release Force, N/dm | Average Release Force, N/dm | Peel description |
|---|---|---|---|---|
| C1 | −8.6 | 16 | 3.5 | very shocky behavior |
| 1 | −3.9 | 5.3 | 1.2 | shocky behavior has lower amplitude and frequency than C1 |
| 2 | 1.9 | 2.7 | 2.2 | smooth peel behavior |

Effect of Fluorinated Copolymer on Performance after Aging

Comparative Example C2

A release film was prepared by coating a solution of SC-2 (25% solids by weight in MEK) on PET film-1 using a No. 6 Mayer rod, and then drying the coated film for 10 minutes at 150° C. Adhesive 1 was wet cast onto this release film by spreading the adhesive onto the release film using a notch bar coater 15 centimeters wide (6 inches) with a 356 micrometer (14 mil) wet gap. This adhesive coated release film was attached to a fiberboard frame and dried for 10 minutes at 70° C. The adhesive/release film system was then laminated to PET film-3. Samples of the laminate were aged for 1 day at 22° C., 7 days at 70° C. and 14 days at 70° C. The laminate samples were then subjected to the Release Test. Results are reported in Table 2.

Example 3

The release film prepared in Example 2 was used to prepare a PET film-1/Adhesive 1/Release film laminate, according to method of Example 2. Samples of the laminate were aged for one day at 22° C., 7 days at 70° C., and 14 days at 70° C. The laminate samples were then subjected to the Release Test. Results are reported in Table 2.

Example 4

A release film was prepared by coating a blended mixture of solution of 1 part of CP-1 and 1 part of SC-1 (1.0% solids by weight in MEK) on PET film-1 using a No. 6 Mayer rod, and then drying the coated film for 10 minutes at 150° C. Adhesive 1 was wet cast onto this release film by spreading the adhesive onto the release film using a notch bar coater 15 centimeters wide (6 inches) with a 356 micrometer (14 mil) wet gap. This adhesive coated release film was attached to a fiberboard frame and dried for 10 minutes at 70° C. The adhesive/release film system was then laminated to PET film-3. Samples of the laminate were aged for one day at 22° C., 7 days at 70° C., and 14 days at 70° C. The laminate samples were then subjected to the Release Test. Results are reported in Table 2.

Example 5

A release film was prepared by coating a blended mixture of solution of 5 parts of CP-5 and 1 part of SC-1 (4.0% solids by weight in MEK) on PET film-1 using a No. 6 Mayer rod, and then drying the coated film for 10 minutes at 150° C. Adhesive 1 was wet cast onto PET film-3 by spreading the adhesive onto the film using a notch bar coater 15 centimeters wide (6 inches) with a 356 micrometer (14 mil) wet gap. This adhesive coated film was attached to a fiberboard frame and dried for 10 minutes at 70° C. The adhesive/film system was then laminated to the release film. Samples of the laminate were aged for one day at 22° C., 7 days at 70° C., and 14 days at 70° C. The laminate samples were then subjected to the Release Test. Results are reported in Table 2 (below).

TABLE 2

| Example | Peel Force after 1 day at 22° C., N/dm | Readhesion, N/dm | Peel Force after 7 days at 70° C., N/dm | Readhesion, N/dm | Peel Force after 14 days at 70° C., N/dm | Readhesion, N/dm |
| --- | --- | --- | --- | --- | --- | --- |
| C2 | 0.62 | 70 | 21 | 51 | 34 | 50 |
| 3 | 0.73 | 58 | 1.2 | 56 | 1.6 | 59 |
| 4 | 1.9 | 54 | 2.0 | 42 | 3.1 | 51 |
| 5 | 0.7 | 62 | 1.8 | 59 | 3.3 | 60 |

Release Performance for Different Adhesives and Fluoropolymers

Example 6

A release film, prepared according to Example 2, was laminated to Tape 1 using a 2.3 kg rubber roller. Samples of the laminate were aged for one day at 22° C. The laminate samples were then subjected to the Release Test. Results are reported in Table 3.

Example 7

A release film, prepared according to Example 2, was laminated to Tape 2 using a 2.3 kg rubber roller. Samples of the laminate were aged for one day at 22° C. The laminate samples were then subjected to the Release Test. Results are reported in Table 3.

Example 8

A release film was prepared by coating a blended mixture of solution of 6 parts of CP-2 and 1 part of SC-1 (1.8% solids by weight in MEK) on PET film-1 using a No. 6 Mayer rod, and then drying the coated film for 10 minutes at 150° C. The release film was system was then laminated to Tape 1. Samples of the laminate were aged for one day at 22° C. The laminate samples were then subjected to the Release Test. Results are reported in Table 3.

Example 9

A release film was prepared by coating a blended mixture of solution of 6 parts of CP-2 and 1 part of SC-1 (1.8% solids by weight in MEK) on PET film-1 using a No. 6 Mayer rod, and then drying the coated film for 10 minutes at 150° C. Adhesive 1 was wet cast onto PET film-3 by spreading the adhesive onto the film using a notch bar coater 15 centimeters wide (6 inches) with a 356 micrometer (14 mil) wet gap. This adhesive coated film was attached to a fiberboard frame and dried for 10 minutes at 70° C. The adhesive/film system was then laminated to the release film. Samples of the laminate were aged for one day at 22° C. The laminate samples were then subjected to the Release Test. Results are reported in Table 3.

Example 10

A release film was prepared by coating a blended mixture of solution of 9 parts of CP-3 and 1 part of SC-1 (5% solids by weight in MEK) on PET film-1 using a No. 6 Mayer rod, and then drying the coated film for 10 minutes at 150° C. The release film was system was then laminated to Tape 1. Samples of the laminate were aged for one day at 22° C. The laminate samples were then subjected to the Release Test. Results are reported in Table 3.

Example 11

A release film was prepared by coating a blended mixture of solution of 9 parts of CP-3 and 1 part of SC-1 (5% solids by weight in MEK) on PET film-1 using a No. 6 Mayer rod, and then drying the coated film for 10 minutes at 150° C. The release film was system was then laminated to Tape 1. Samples of the laminate were aged for one day at 22° C. The laminate samples were then subjected to the Release Test. Results are reported in Table 3 (below).

TABLE 3

| Example | Peel Force after 1 day at 22° C., N/dm | Readhesion, N/dm |
| --- | --- | --- |
| 6 | 1.3 | 39 |
| 7 | 2.0 | 54 |
| 8 | 1.3 | 42 |
| 9 | 0.54 | 51 |
| 10 | 1.2 | 43 |
| 11 | 1.2 | 38 |

Durability Study from Rub Test

Comparative Example C3

The release film from Comparative Example C1 was prepared. When the Rub Test was carried out as described above, significant removal of release material was detected.

Example 12

The release film from Example 2 was prepared. When the Rub Test was carried out as described above, no removal of release material was detected by finger rubbing.

Blending Effect on Repellent and Marker Resistance

Examples 13-33 and Comparative Examples C4-C6

Examples 13-33 the Solutions 1-7 were used. Mixtures of the Solutions were made according to the amounts shown in Table 4, the mixtures were coated onto PET Film-2 using a No. 6 Mayer rod; and then, the coating was allowed to dry at room temperature for 2 minutes and then was cured in a 150° C. oven for two minutes. Contact angle data were measured from the coated film after cooling using the Test Method described above and are reported in Table 4 (below).

TABLE 4

| Example | Solution Mixture (parts) | Contact Angle with Water, degrees | | Contact Angle with Oil, degrees | |
|---|---|---|---|---|---|
| | | Advancing | Receding | Advancing | Receding |
| 13 | CP-1/SC-1 (90/10) | 117 | 90 | 75 | 55 |
| 14 | CP-1/SC-1 (80/20) | 116 | 91 | 70 | 56 |
| 15 | CP-1/SC-4 (90/10) | 123 | 98 | 74 | 54 |
| 16 | CP-1/SC-4 (80/20) | 120 | 89 | 76 | 57 |
| 17 | CP-1/SC-5 (90/10) | 116 | 65 | 71 | 54 |
| 18 | CP-1/SC-5 (80/20) | 117 | 92 | 68 | 53 |
| C4 | CP-1 | 123 | 102 | 75 | 62 |
| 19 | CP-3/SC-1 (90/10) | 118 | 97 | 64 | 45 |
| 20 | CP-3/SC-1 (80/20) | 115 | 85 | 68 | 47 |
| 21 | CP-3/SC-4 (90/10) | 117 | 92 | 68 | 51 |
| 22 | CP-3/SC-4 (80/20) | 114 | 90 | 64 | 40 |
| 23 | CP-3/SC-5 (90/10) | 118 | 95 | 67 | 55 |
| 24 | CP-3/SC-5 (80/20) | 114 | 102 | 62 | 52 |
| C5 | CP-3 | 117 | 92 | 71 | 63 |
| 25 | CP-4/SC-1 (90/10) | 115 | 96 | 67 | 53 |
| 26 | CP-4/SC-1 (80/20) | 114 | 93 | 67 | 54 |
| 27 | CP-4/SC-4 (90/10) | 115 | 97 | 69 | 52 |
| 28 | CP-4/SC-4 (80/20) | 115 | 92 | 68 | 53 |
| 29 | SC-4/SC-5 (90/10) | 115 | 97 | 70 | 58 |
| 30 | CP-4/SC-5 (80/20) | 116 | 91 | 68 | 56 |
| C6 | CP-4 | 114 | 96 | 73 | 70 |
| 31 | CP-2/SC-1 (14/86) | 118 | 93 | 70 | 53 |
| 32 | CP-2/SC-1 (25/75) | 112 | 92 | 63 | 48 |
| 33 | CP-2/SC-1 (50/50) | 112 | 90 | 70 | 52 |

Examples 34-41 and Comparative Examples C7-C8

For Examples 34-41, Solution Mixtures indicated in Table 5 were coated onto PET Film-2 using a No. 6 Mayer rod. After allowing them to dry at room temperature for 2 minutes; then the coated film then was cured in a 150° C. oven for five minutes. Marker test data were collected from the coated film after cooling to room temperature using the Test Method described above and are reported in Table 5 (below).

TABLE 5

| Example | Solution Mixture (parts) | Marker 1 | Marker 2 |
|---|---|---|---|
| 34 | CP-1/SC-1 (90/10) | 2 | 2 |
| 35 | CP-1/SC-1 (80/20) | 1 | 1 |
| 36 | CP-1/SC-1 (50/50) | 1 | 1 |
| 37 | CP-1/SC-1 (67/33) | 1 | 1 |
| C7 | CP-1 | 5 | 5 |
| 38 | CP-5/SC-1 (90/10) | 2 | 3 |
| 39 | CP-5/SC-1 (33/67) | 1 | 1 |
| 40 | CP-5/SC-1 (50/50) | 1 | 1 |
| 41 | CP-5/SC-1 (33/67) | 1 | 1 |
| C8 | CP-5 | 5 | 5 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A curable composition comprising:
   (a) a fluoropolymer that is a reaction product of components comprising a polyfunctional (meth)acrylate and a fluoroacrylate monomer represented by the formula:

wherein:
   n is an integer in a range of from 1 to 6, inclusive,

X is wherein:
   R is H or an alkyl group having 1 to 4 carbon atoms;
   m is an integer in a range of from 2 to 8, inclusive;
   $R_f$ is $C_nF_{2n+1}$;
   y is an integer in a range of from 0 to 6, inclusive;
   q is an integer in a range of from 1 to 8, inclusive; and
   A is a hydrocarbylene group;
   p is an integer in a range of from 2 to 30, inclusive; and
   R' is H, $CH_3$, or F;
   (b) a silicone having a plurality of vinyl groups;
   (c) a silicone having a plurality of Si—H groups; and
   (d) a hydrosilation catalyst.

2. A curable composition according to claim 1, wherein the components further comprise a chain transfer agent.

3. A curable composition according to claim 1, wherein the fluoropolymer is a reaction product of components comprising a polyfunctional (meth)acrylate and a fluoroacrylate monomer represented by the formula:

wherein R' is H, CH$_3$, or F.

4. A curable composition according to claim 1, wherein at least one of the silicones comprises a fluorosilicone.

5. A curable composition according to claim 1, wherein the polyfunctional (meth)acrylate is a polyethylene glycol di(meth)acrylate.

6. A curable composition according to claim 1, wherein the weight ratio of fluoropolymer to silicone is in a range of from 1:2 to 5:1, inclusive.

7. A method of making a composition comprising:
at least partially curing a curable composition, the curable composition comprising:
(a) a fluoropolymer that is a reaction product of components comprising a polyfunctional (meth)acrylate and a fluoroacrylate monomer represented by the formula:

wherein:
n is an integer in a range of from 1 to 6, inclusive, wherein:
R is H or an alkyl group having 1 to 4 carbon atoms;
m is an integer in a range of from 2 to 8, inclusive;
R$_f$ is C$_n$F$_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, CH$_3$, or F;
(b) a silicone having a plurality of vinyl groups;
(c) a silicone having a plurality of Si—H groups; and
(d) a hydrosilation catalyst.

8. A method according to claim 7, wherein the components further comprise a chain transfer agent.

9. A method according to claim 7, wherein the fluoropolymer is a reaction product of components comprising a polyfunctional (meth)acrylate and a fluoroacrylate monomer represented by the formula:

wherein R' is H, CH$_3$, or F.

10. A method according to claim 7, wherein at least one of the silicones comprises a fluorosilicone.

11. A composition comprising a reaction product of a curable composition comprising:
(a) a fluoropolymer that is a reaction product of components comprising a polyfunctional (meth)acrylate and a fluoroacrylate monomer represented by the formula:

wherein:
n is an integer in a range of from 1 to 6, inclusive, wherein:
R is H or an alkyl group having 1 to 4 carbon atoms;
m is an integer in a range of from 2 to 8, inclusive;
R$_f$ is C$_n$F$_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, CH$_3$, or F;
(b) a silicone having a plurality of vinyl groups;
(c) a silicone having a plurality of Si—H groups; and
(d) a hydrosilation catalyst.

12. A composition according to claim 11, wherein the components further comprise a chain transfer agent.

13. A composition according to claim 11, wherein the fluoropolymer is a reaction product of components comprising a polyfunctional (meth)acrylate and a fluoroacrylate monomer represented by the formula:

wherein R' is H, CH$_3$, or F.

14. A composition according to claim 11, wherein the polyfunctional (meth)acrylate is a polyethylene glycol di(meth)acrylate.

15. A composition according to claim 11, wherein the weight ratio of fluoropolymer to silicone is in a range of from 1:2 to 5:1, inclusive.

16. A release liner comprising a carrier and a release material, wherein the release material is present on at least one major surface of the carrier, and wherein the release material comprises a reaction product of a curable composition comprising:

(a) a fluoropolymer that is a reaction product of components comprising a polyfunctional (meth)acrylate and a fluoroacrylate monomer represented by the formula:

wherein:
n is an integer in a range of from 1 to 6, inclusive, wherein:
R is H or an alkyl group having 1 to 4 carbon atoms;
m is an integer in a range of from 2 to 8, inclusive;
R$_f$ is C$_n$F$_{2n+1}$;

y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, CH$_3$, or F;

(b) a silicone having a plurality of vinyl groups;
(c) a silicone having a plurality of Si—H groups; and
(d) a hydrosilation catalyst.

17. A release liner according to claim 16, wherein the components further comprise a chain transfer agent.

18. A release liner according to claim 16, wherein the fluoropolymer is a reaction product of components comprising a polyfunctional (meth)acrylate and a fluoroacrylate monomer represented by the formula:

wherein R' is H, CH$_3$, or F.

19. A release liner according to claim 16, wherein at least one of the silicones comprises a fluorosilicone.

20. A release liner according to claim 16, wherein the carrier comprises at least one of paper or a thermoplastic polymeric film.

21. A release liner according to claim 16, wherein the polyfunctional (meth)acrylate is a polyethylene glycol di(meth)acrylate.

22. A release liner according to claim 16, wherein the weight ratio of fluoropolymer to silicone is in a range of from 1:2 to 5:1, inclusive.

23. An adhesive article comprising:
a substrate having first and second opposed major surfaces;
a first layer of pressure sensitive adhesive in contact with at least a portion of the first major surface; and
a first release liner releasably bonded to at least a portion of the first adhesive layer, the first release liner comprising a first carrier and a first release material, wherein the first release material is present on at least one major surface of the first carrier, and wherein the first release material comprises a reaction product of a first curable composition comprising:
(a) a first fluoropolymer that is a reaction product of components comprising a polyfunctional (meth)acrylate and a fluoroacrylate monomer represented by the formula:

wherein:
n is an integer in a range of from 1 to 6, inclusive, wherein:
R is H or an alkyl group having 1 to 4 carbon atoms;
m is an integer in a range of from 2 to 8, inclusive;
$R_f$ is $C_nF_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, $CH_3$, or F; and
(b) a first silicone having a plurality of vinyl groups;
(c) a first silicone having a plurality of Si—H groups; and
(d) a first hydrosilation catalyst.

24. An adhesive article according to claim 23, wherein the components further comprise a chain transfer agent.

25. An adhesive article according to claim 23, wherein the first fluoropolymer is a reaction product of components comprising a polyfunctional (meth)acrylate and a fluoroacrylate monomer represented by the formula:

wherein R' is H, $CH_3$, or F.

26. An adhesive article according to claim 23, wherein at least one of the first silicones comprises a fluorosilicone.

27. An adhesive article according to claim 23, wherein the first carrier comprises at least one of paper or a thermoplastic polymeric film.

28. An adhesive article according to claim 23, wherein the first pressure sensitive adhesive comprises a silicone.

29. An adhesive article according to claim 23, wherein the first pressure sensitive adhesive comprises a tackified polydiorganosiloxane polyurea block copolymer.

30. An adhesive article according to claim 23, wherein the polyfunctional (meth)acrylate is a polyethylene glycol di(meth)acrylate.

31. An adhesive article according to claim 23, wherein the weight ratio of fluoropolymer to silicone is in a range of from 1:2 to 5:1, inclusive.

32. An adhesive article according to claim 23, further comprising:
a second layer of pressure sensitive adhesive in contact with at least a portion of the second major surface; and
a second release liner releasably bonded to at least a portion of the second adhesive layer, the second release liner comprising a second carrier and a second release material, wherein the second release material is present on at least one major surface of the second carrier, and wherein the second release material comprises a reaction product of a second curable composition comprising:
(a) a second fluoropolymer that is a reaction product of components comprising a second polyfunctional (meth)acrylate and a second monomer represented by the formula:

wherein:
n is an integer in a range of from 1 to 6, inclusive, wherein:
R is H or an alkyl group having 1 to 4 carbon atoms;
m is an integer in a range of from 2 to 8, inclusive;
$R_f$ is $C_nF_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, $CH_3$, or F; and
(b) a second silicone having a plurality of vinyl groups;
(c) a second silicone having a plurality of Si—H groups; and
(d) a second hydrosilation catalyst.

33. An adhesive article according to claim 32, wherein the components further comprise a chain transfer agent.

34. An adhesive article according to claim 32, wherein the second fluoropolymer is a reaction product of components comprising a second polyfunctional (meth)acrylate and a fluoroacrylate monomer represented by the formula:

$$H_2C=\underset{R'}{\overset{O}{\overset{\|}{C}}}CO(CH_2)_2O\overset{O}{\overset{\|}{C}}\underset{H}{N}-\phenyl-CH_2-\phenyl-\underset{H}{N}\overset{O}{\overset{\|}{C}}O(CH_2)_2\underset{H_3C}{N}-\overset{O}{\underset{O}{\overset{\|}{\underset{\|}{S}}}}(CF_2)_3CF_3$$

wherein R' is H, CH$_3$, or F.

35. An adhesive article according to claim 32, wherein at least one of the second silicones comprises a fluorosilicone.

36. An adhesive article according to claim 32, wherein the first and second release liners are not identical.

37. An adhesive article comprising:
a substrate having first and second opposed major surfaces;
a layer of pressure sensitive in contact with at least a portion of the first major surface; and
a low adhesion backsize bonded to the second major surface, wherein the low adhesion backsize comprises a reaction product of a curable composition comprising:
(a) a fluoropolymer that is a reaction product of components comprising a second polyfunctional (meth)acrylate and a second monomer represented by the formula:

$$C_nF_{2n+1}-X-OCNH-A-HNCO-(C_pH_{2p})-O\overset{O}{\overset{\|}{C}}\underset{R'}{C}=CH_2$$

wherein:
n is an integer in a range of from 1 to 6, inclusive,

X is $-\underset{O}{\overset{O}{\overset{\|}{\underset{\|}{S}}}}-\underset{R}{N}C_mH_{2m}-$, $-\overset{O}{\overset{\|}{C}}\underset{H}{N}C_mH_{2m}-$, $-\underset{H}{\overset{R_f}{C}}-OC_yH_{2y}-$, $-OC_qH_{2q}-$, or $-C_qH_{2q}-$, wherein:
R is H or an alkyl group having 1 to 4 carbon atoms;
m is an integer in a range of from 2 to 8, inclusive;
R$_f$ is C$_n$F$_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, CH$_3$, or F;
(b) a silicone having a plurality of vinyl groups;
(c) a silicone having a plurality of Si—H groups; and
(d) a hydrosilation catalyst.

38. An adhesive article according to claim 37, wherein the components further comprise a chain transfer agent.

39. An adhesive article according to claim 37, wherein the fluoropolymer is a reaction product of components comprising a polyfunctional (meth)acrylate and a fluoroacrylate monomer represented by the formula:

$$H_2C=\underset{R'}{\overset{O}{\overset{\|}{C}}}CO(CH_2)_2O\overset{O}{\overset{\|}{C}}\underset{H}{N}-\phenyl-CH_2-\phenyl-\underset{H}{N}\overset{O}{\overset{\|}{C}}O(CH_2)_2\underset{H_3C}{N}-\overset{O}{\underset{O}{\overset{\|}{\underset{\|}{S}}}}(CF_2)_3CF_3$$

wherein R' is H, CH$_3$, or F.

40. An adhesive article according to claim 37, wherein at least one of the silicones comprises a fluorosilicone.

41. An adhesive article according to claim 37, wherein at least a portion of the layer of pressure sensitive adhesive contacts the low adhesion backsize.

42. An adhesive article according to claim 37, wherein the polyfunctional (meth)acrylate is a polyethylene glycol di(meth)acrylate.

43. An adhesive article according to claim 37, wherein the weight ratio of fluoropolymer to silicone is in a range of from 1:2 to 2:1, inclusive.

44. An adhesive article according to claim 37, wherein the first pressure sensitive adhesive comprises a silicone.

45. An adhesive article according to claim 38, wherein the first pressure sensitive adhesive comprises a tackified polydiorganosiloxane polyurea block copolymer.

46. An adhesive article comprising:
a substrate having first and second opposed major surfaces;
a layer of a first release material bonded to at least a portion of the first major surface;
a layer of a second release material bonded to at least a portion of the second major surface;
a layer of a first pressure sensitive adhesive releasably bonded to at least a portion of the layer of the first release material;
a layer of a second pressure sensitive adhesive releasably bonded to at least a portion of the layer of the second release material;
a first substrate bonded to at least a portion of the layer of the first pressure sensitive;
a second substrate bonded to at least a portion of the layer of the second pressure sensitive;
wherein at least one of the layer of the first release material and the layer of the second release material comprises a reaction product of a curable composition comprising:
(a) a fluoropolymer that is a reaction product of components comprising a second polyfunctional (meth)acrylate and a second monomer represented by the formula:

wherein:

n is an integer in a range of from 1 to 6, inclusive, wherein:

R is H or an alkyl group having 1 to 4 carbon atoms;
m is an integer in a range of from 2 to 8, inclusive;
$R_f$ is $C_nF_{2n+1}$;
y is an integer in a range of from 0 to 6, inclusive;
q is an integer in a range of from 1 to 8, inclusive; and
A is a hydrocarbylene group;
p is an integer in a range of from 2 to 30, inclusive; and
R' is H, $CH_3$, or F;
(b) a silicone having a plurality of vinyl groups;
(c) a silicone having a plurality of Si—H groups; and
(d) a hydrosilation catalyst.

47. An adhesive article according to claim 46, wherein the components further comprise a chain transfer agent.

48. An adhesive article according to claim 46, wherein the layers of first and second pressure sensitive adhesives and/or their associated layers of first and second release materials, respectively, are selected such that the release of each layer of pressure sensitive from its associated layer of release material occurs at a different level of applied peel force.

* * * * *

UNITED STATES PATENT AND TRADEMARK OFFICE
CERTIFICATE OF CORRECTION

PATENT NO. : 7,279,210 B2　　　　　　　　　　　　　　　　　　　Page 1 of 1
APPLICATION NO. : 11/239455
DATED : October 9, 2007
INVENTOR(S) : John C. Hulteen It is certified that error appears in the above-identified patent and that said Letters Patent is hereby corrected as shown below:

Column 9
Line 29, delete "U.S. Pat. No." before "4,980,440".

Column 12
Line 12, delete "Mass.," and insert -- Mass. -- in place thereof.

Column 19
Line 11, insert -- For -- before "Examples".

Column 29
Line 15, Claim 46, insert -- or -- before "—$C_qH_{2q}$—".

Signed and Sealed this

Twenty-fifth Day of December, 2007

JON W. DUDAS
*Director of the United States Patent and Trademark Office*